United States Patent [19]
Fosberg

[11] 3,800,219
[45] Mar. 26, 1974

[54] METHOD AND APPARATUS FOR DETECTING OIL POLLUTION IN WATER

[76] Inventor: Theodore M. Fosberg, 1913 S.W. 167th, Seattle, Wash. 98166

[22] Filed: Oct. 10, 1972

[21] Appl. No.: 296,335

Related U.S. Application Data

[63] Continuation of Ser. No. 94,899, Dec. 3, 1970, abandoned.

[52] U.S. Cl. .............................. 324/65 R, 340/236
[51] Int. Cl. ............................................. G01r 27/02
[58] Field of Search..... 73/421; 324/65 R, 30, 71 E; 340/236, 270

[56] References Cited
UNITED STATES PATENTS
3,370,360  2/1968  Smith ........................ 324/65 R X
3,572,128  3/1971  Hemeon ........................ 73/421 R FOREIGN PATENTS OR APPLICATIONS
1,399,477  4/1965  France ................................ 324/65

Primary Examiner—Stanley T. Krawczewicz
Attorney, Agent, or Firm—Graybeal, Barnard, Uhlir & Hughes

[57] ABSTRACT

An apparatus which floats on the surface of the water in which oil pollution is to be detected. The apparatus comprises a collector wheel having an oleophilic perimeter surface (such as polyethylene); the bottom portion of this wheel dips below the surface of the water on which the apparatus floats, and as the wheel rotates its perimeter surface picks up water if no oil is present. However, if there is even a small amount of oil on the surface of the water, the wheel perimeter will become coated with oil to the exclusion of water. A collector blade removes the liquid from the wheel perimeter and directs it to a detecting surface having at least two spaced electrodes. A voltage is imposed across the electrodes, and when water is deposited on the detecting surface, it will cause a small current to be conducted. However, when oil is deposited on the detecting surface, no current flows between the electrodes and an alarm system is activated. An oscillating wiper keeps the scraper and detecting surface free of sludge or other impurities.

11 Claims, 5 Drawing Figures

PATENTED MAR 26 1974 3,800,219

INVENTOR.
THEODORE M. FOSBERG
BY Greybeal Cole and
Barnard

ATTORNEYS

INVENTOR.
THEODORE M. FOSBERG
BY Greybeal Cole and Barnard

ATTORNEYS

METHOD AND APPARATUS FOR DETECTING OIL POLLUTION IN WATER

This is a continuation, of application Ser. No. 94,899, filed Dec. 3, 1970, now abandoned.

BACKGROUND OF THE INVENTION

This invention relates to detecting oil contamination in a body of water, such as, for example, sewage water flowing into a sewage treatment plant.

DESCRIPTION OF THE PRIOR ART

Contamination from oil (i.e., petroleum; petroleum products, such as heating oil, gasoline, lubricants, etc.; petroleum derivatives and other non-conductive organic fluids which are immiscible with water and float on the surface) can occur in various ways. For example, direct environmental pollution occurs when the oil passes into streams, rivers and ocean water, resulting in desctruction of fresh water and marine life, wild life and recreational facilities. Another serious oil pollution problem occurs when oil passes into a sewer system which in turn feeds sewage water to a treatment plant. This can occur from promiscuous dumping from gas stations, railroad yards, airports, manufacturing plants, etc. The oil will generally contaminate the digester in the sewage treatment plant so that there must be shutdown for cleaning and start-up. During this time it may be necessary to discharge the raw sewage into a river, lake or ocean, which then results in environmental pollution.

Early and reliable detection of oil contamination in water is important so that timely remedial steps can be taken. There are various methods for detecting oil in a laboratory environment, and in recent years more serious effort has been directed toward detecting the presence of oil in bodies of water such as sewer water influent, streams, etc. One prior art method is to direct a light onto the surface of the water and detect the intensity and/or character of the reflected light. If there is oil on the surface of the water, the reflected light will be different from that reflected by unpolluted water to indicate the presence of oil.

Another prior art method has been to place a plurality of probes at various elevations from the water surface and below. If there is oil on the water surface, the conductance between the electrodes at the surface and just below the surface will vary from the electrodes further below and this will trigger an alarm. One of the problems with this method is that it takes at least approximately a quarter of an inch of oil before detections can occur; so this system requires some sort of sump arrangement to collect the contaminating oil in sufficient quantity for detection.

To the best knowledge of the inventor herein, none of the prior art attempts have achieved commercial success as a completely satisfactory and reliable means of early detection of oil contamination in water. Thus it is an object of the present invention to provide a commercially practical and reliable method and apparatus which will detect oil contamination in water, such as sanitary sewer water and streams, and particularly which will detect a quite small degree of oil contamination so that early identification is possible.

SUMMARY OF THE PRESENT INVENTION

In the present invention there is a liquid collector device which has a collector surface that is oleophilic and hydrophilic but is preferentially oleophilic in that when this surface is moved onto and out of contact with the surface portion of the water in which contamination is to be detected, it will preferentially become coated with oil when both oil and water are present. (The word, "hydrophilic," is used herein in a broader sense to refer to material which, when coming into contact with water, picks up water.) In the preferred embodiment, this collector device comprises a wheel whose perimeter surface is the collector surface. The extreme lower end of the wheel reaches just below the surface of the water. As the wheel rotates a collector blade removes the liquid (water or oil) from the perimeter surface of the wheel and directs it onto a detector plate on which there is a pair of spaced electrodes. The detector apparatus imposes a voltage across the electrodes, and indicates a no alarm condition when an electric current is passing between the electrodes by virtue of water being on the detector plate. However, when oil is deposited on the plate, the current is reduced to substantially zero and the detector indicates an alarm condition.

To keep the blade and detector plate clear of sludge or other impurities, there is a wiper which oscillates back and forth over these components with a pair of flexible scrapers provided to keep the wiper clean. The entire apparatus floats on the surface of the body of water in which oil pollution is to be detected.

DESCRIPTION OF THE PREFERRED EMBODIMENT

Figure 1:
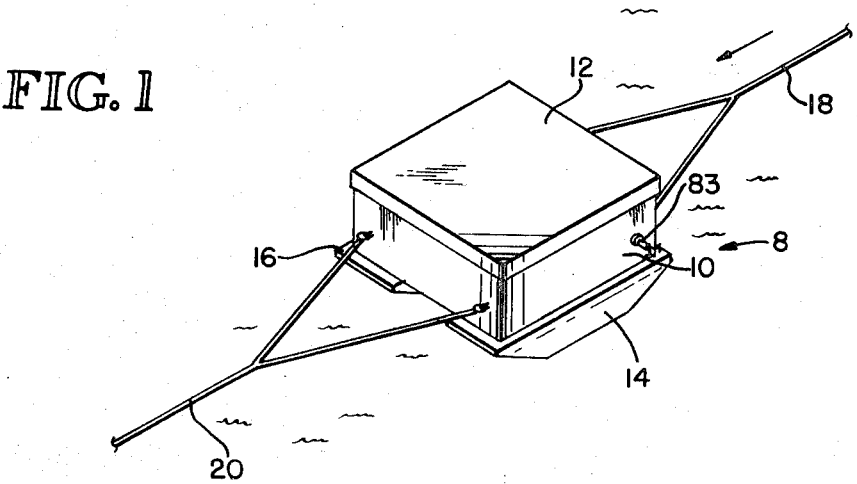
FIG. 1 is an isometric view of the present invention in its operational environment.
Figure 2:
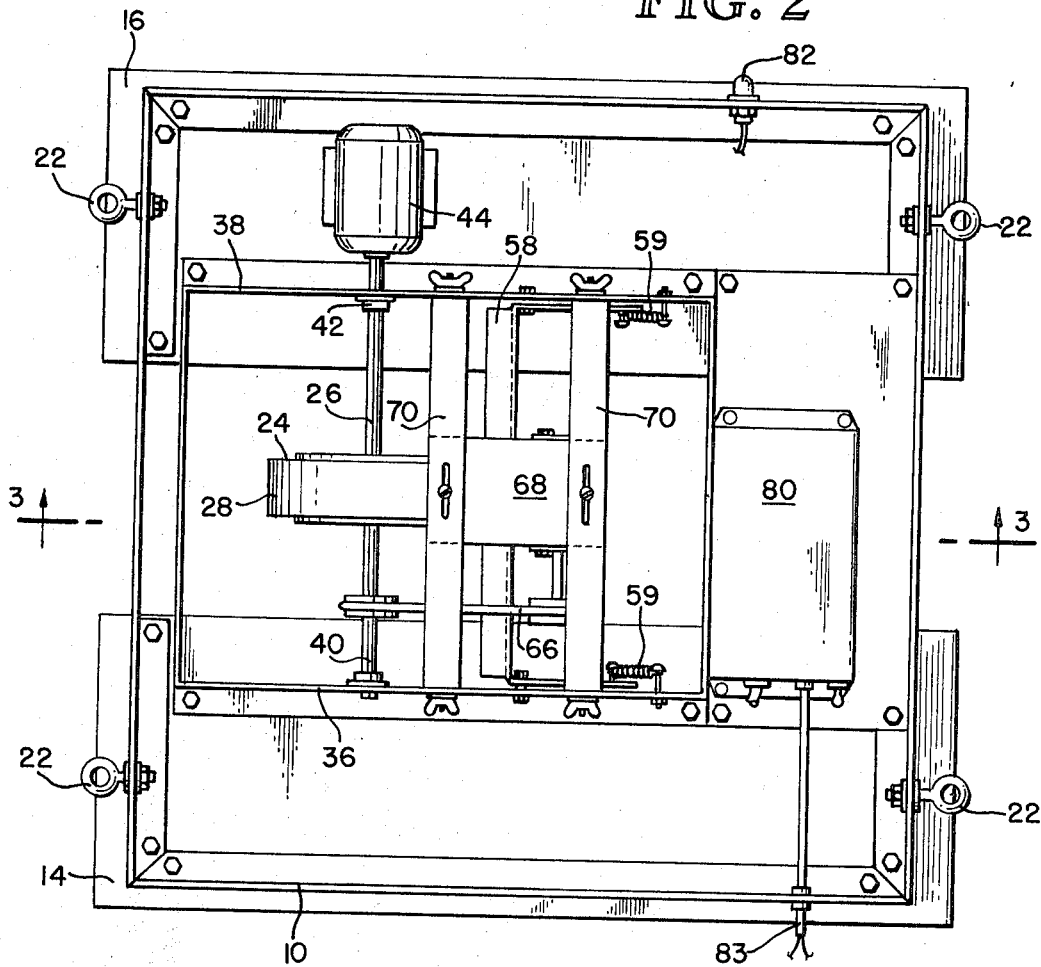
FIG. 2 is a top plan view of the present invention with the top cover removed.

The apparatus of the present invention is generally designated 8 and comprises a box-like housing 10 having a top removable cover 12. The housing 10 floats on a pair of right and left pontoons 14 and 16, respectively, and is anchored at its upstream end by a rope 18 and similarly anchored at its downstream end by the rope 20. Eyebolts 22 are provided to connect the ropes 18 and 20 to the housing 10. The present invention will be described in an environment of detecting oil polution in sanitary sewer water flowing into a sewage treatment plant. Thus the apparatus 8 floats on its pontoons 14 and 16 in a stream of sewer water which flows by the apparatus as it remains anchored by its ropes 18 and 20 in a stationary location. The upstream end of the apparatus will be referred to as the forward end and the downstream end as the rear end.

The liquid collector or sampling device of the present invention comprises a wheel 24 mounted to an axle 26 for rotation on its center about a transverse horizontal axis. The perimeter surface 28 of the wheel is coated with a material, such as polyethylene, which is both oleophilic and hydrophilic, but is preferentially oleophilic in that in the presence of both oil and water, it will selectively become coated with oil to the exclusion of water. The wheel 24 is so positioned with respect to the housing 10 and the pontoons 14 and 16 that with the apparatus 8 floating in water, the lower perimeter portion 30 of the wheel 24 dips moderately below the surface 32 of the sewer water 34. The axle 26 is journal mounted to support plates 36 and 38 at 40 and 42, respectively, and driven from an electric motor 44.

Figure 3:
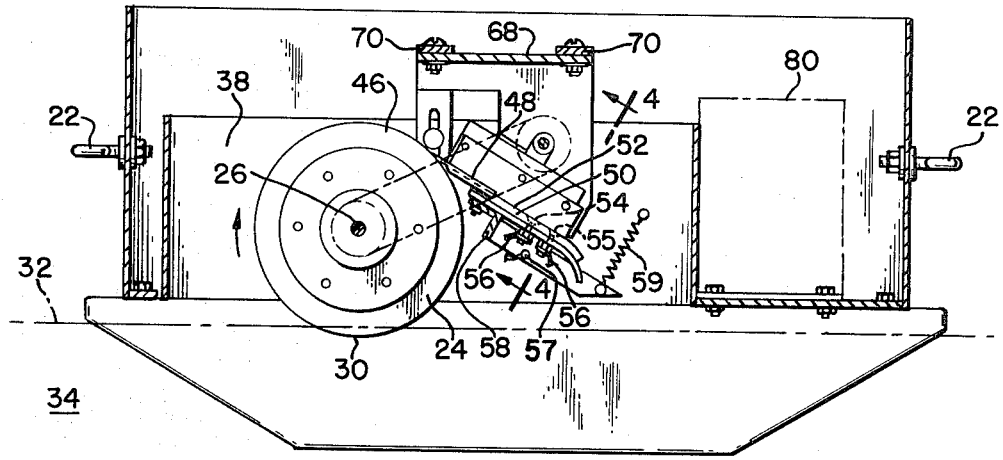
FIG. 3 is a longitudinal sectional view taken along line 3—3 of FIG. 2.

The wheel 24 rotates, as seen in FIG. 3, in a clockwise direction, so that the lower perimeter portion 30 of the wheel 24 is traveling rearwardly in the same direction as the flow of sewer water passing by the apparatus 8.

At the upper forward perimeter portion 46 of the wheel 24 (i.e., that portion of the wheel which is beginning its downward travel) there is a collector blade 48 positioned against the wheel perimeter 28 in nearly tangential relationship therewith to remove liquid from the wheel perimeter surface 28. Coplanar with and extending downwardly from the blade 48 is a detector plate 50 having a teflon detector surface 52 over which flows liquid removed from the wheel perimeter surface 46 by the blade 48. At the detector surface 52 are two pairs of electrodes 54 and 55, connected to electric wires 56 so that a voltage may be imposed between these pairs of electrodes 54 and 55. There is a heating element 57 to keep the leads 56 dry. After the liquid (water or oil) flows over the blade 48 and over the detecting plate 50, this liquid drops back into the flowing water 34. The blade 48 and plate 50 are mounted to a cross bar 58 which in turn is pivotally mounted to the plates 36 and 38. A pair of tension springs 59 urge the bar 58 to rotate so as to press the collector blade 48 with moderate pressure against the wheel 24.

To keep the blade 48 and detector plate 50 free from sludge-like impurities, there is a wiper 60 which extends the length of the blade 48 and plate 50 and is arranged to oscillate back and forth over the blade 48 and plate 50. To accomplish this back and forth wiping motion, the upper portion of the wiper 60 is secured to a follower nut 62 which is in turn mounted to a transversely-horizontally aligned reciprocating worm drive 64. This worm drive 64 is in turn powered by a belt drive 66 that is driven from the aforementioned wheel shaft 26 by the motor 44. The worm drive 64 is rotatably mounted to an overhead bracket 68 which is in turn adjustably mounted to a pair of cross bars 70 secured to the mounting plates 36 and 38. As the worm drive 64 rotates, the reciprocating action of the follower nut 62 causes the wiper 60 to travel back and forth across the surface of the collector blade 48 and the detector plate 50.

Figure 4:
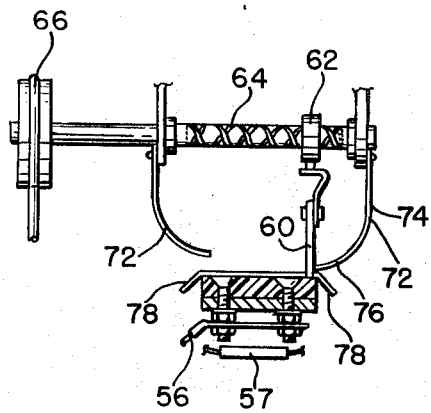
FIG. 4 is a sectional view taken on line 4—4 of FIG 3.
Figure 5:
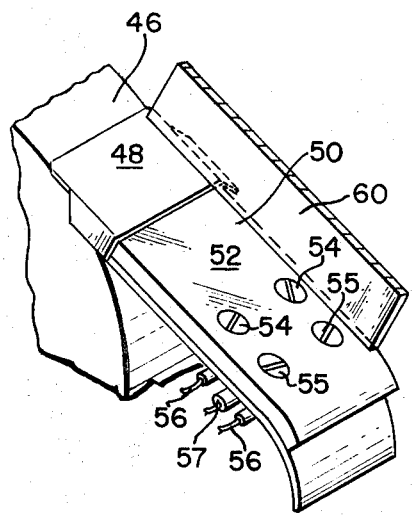
FIG. 5 is an isometric view of the scraper and detector plate of the apparatus of the present invention.

To keep the wiper 60 itself free of sludge which may collect thereon, there are a pair of flexible scrapers 72 placed on opposite sides of the blade 60. Each scraper 72 comprises a downwardly extending plate portion 74 which has an inturned lower edge 76 which reaches inwardly to terminate a short distance above the lower edge of the wiper 60 at a location moderately inward from the outer limit of travel of the wiper 60. Thus, as can be seen in FIG. 4, when the wiper 60 travels, for example, to the right, it engages the lower edge 76 of the right hand scraper 72 and pushes it outwardly, thus causing the lower scraper arm portion 76 to scrape downwardly against the wiper blade 60 as the scraper portion 76 is pushed downwardly and outwardly. The sludge or other impurities so scraped off the wiper 60 fall off the downturned edge portion 78 of the collector blade 48 and the detector plate 50.

The detector apparatus 80 is or may be made up of standard electrical and/or electronic components in a conventional arrangement, (e.g. a Brush MK II two channel strip chart recorder which records the electrical resistance between two points) and thus will be described only functionally herein. This apparatus 80 is mounted at the forward end of the housing 10 and provides a voltage source to impose a voltage across the electrode pairs 54 and 55, the wires 56 from the electrodes 54 and 55 being connected to the detecting apparatus 80. When there is water on the detector plate 50, a small electric current will pass between the electrodes 54 and 55 and will cause the detecting apparatus 80 to remain in a "no alarm" condition. However, when there is oil on the detector plate 50, since oil is not electrically conductive, substantially no current will pass between the electrodes 54 and 55. The detector 80 is so arranged that when the current between the electrodes 54 and 55 drops off, the detector 80 will signal an alarm condition. When the detector 80 indicates an alarm condition, this will activate a suitable indicator or alarm circuit, such as the light shown at 82 or the remote alarm circuit shown at 83. Of course, other indicating means, such as a bell or an alarm at a remote location or perhaps a correcting mechanism, such as diverting sluice gate may be utilized. The response time of the detector 80 is sufficiently slow that brief current reductions from the wiper 60 wiping off the water will not cause an alarm condition, as long as water continues to be supplied to the detector surface 52 by the collector blade 48 removing water from the wheel 24.

To describe the overall operation of the apparatus 8 of the present invention, let it be assumed that it is desired to detect the presence of oil in sewage influent which is leading into a sewage treatment plant. The apparatus 8 is placed in the stream of sewage and floats on its pontoons 14 and 16. It is suitably secured at a stationary position by the ropes 18 and 20. The electric motor 44 is energized to turn the collector wheel 24 and also cause the wiper 60 to oscillate back and forth across the surfaces of the collector blade 48 and the detector plate 50. The perimeter surface 28 of the wheel 24 is a continuous closed surface, and thus as the wheel 24 rotates, this surface 28 travels a continuous closed path leading into and out of the sewer water.

When only sewer water is present, the water will adhere to the wheel perimeter surface 28 and travel upwardly to the location of the collector blade 48. The water on the perimeter surface 28 is divereted onto the blade 48 and flows down over the detector plate 50. As long as there is water on the surface 52 of the detector plate 50 there will be a small electric current flowing between the electrodes 54 and 55, and the detector 80 will indicate a quiescent or a "no alarm" condition. Thus, the detector is actively monitoring the presence of water on the detector plate 50. When water or a similarly conductive material is absent from the collector plate 50, the detector 80 will indicate an "alarm" condition.

When small amounts of oil begin to be present in the sewer water flowing by the apparatus, the oil floating on the surface 32 of the water 34 will adhere to the selectively oleophilic perimeter suraface 28 of the wheel 24 and will effectively exclude water from collecting on the wheel surface 28. Thus, as the oil on the wheel 24 reaches the collector blade 48, the oil will flow down over the detector plate 50. As oil collects on the plate 50, the current between the electrodes 54 and 55 diminishes to substantially zero, and the detecting apparatus 80 signals an "alarm" condition (which as shown herein is the light 82 being turned on and the alarm circuit 83 being electrically "open"). Thus, the apparatus of the present invention is fail safe in that it will indicate a quiescent condition only when the system is functioning and depositing water on the collector plate 50, and water can only be deposited on the wheel collecting surface 28 when there is substantially no oil in the water 32.

EXPERIMENT NO. 1

The test location for this experiment was the Des Moines sewage treatment plant in the city of Des Moines, state of Washington, U.S.A. The apparatus described in the specification of the present application was disposed over sewage influent to the Des Moines sewage treatment plant and tethered at a location three feet upstream of the flume of the sewage treatment plant. The remote alarm circuit from the detector was wired into the sewage flow recorder. The flow of sewage water past the detector apparatus was at a rate of about 700 gallons per minute. Two feet upstream of the detecting device, oil was added to the sewage influent at the rate of 0.25 gallons per minute. Within one minute of the time oil was started to be added to the sewer water influent, the detector went to an "alarm" condition to signal the presence of oil in the sewage water.

EXPERIMENT NO. 2

The apparatus of the present invention was placed in the same location as indicated in Experiment No. 1 and left in location. After about two weeks, when the operator of the sewage treatment plant came on duty at 8 o'clock in the morning, he noted that the recorder tracing from the detector indicated that the detector had signaled an alarm condition. The presence of oil in the sewage treatment plant was indicated by observation of the oil floating on the sewage in the plant. An oil film (about 1/16 of an inch thick) was also found on the lower portion of the oil detector scraper to further confirm the presence of oil contamination. The presence of oil in this sewage treatment plant was an unplanned event, and the oil came from an unknown source. However, the device of the present invention did function to detect the presence of oil.

Now, therefore, I claim:

1. An apparatus to detect oil pollution in a body of water, comprising:
   a. a collector device having a collector surface which is both oleophilic and hydrophilic, but is preferentially oleophilic in that the surface will become coated preferentially with oil when coming into contact with both oil and water,
   b. means to move said device in a path such that said collector surface moves into contact with said body of water to collect sample liquid, and to a collecting location of said apparatus,
   c. a detecting surface located at said detecting location,
   d. removing means to remove liquid from said collector device and deposit said removed liquid on said detecting surface, and
   e. sensing means at said detecting surface to sense the character of the sample liquid on said detecting surface.

2. The apparatus as recited in claim 1, further comprising electrode means mounted at said detecting surface to make electrical contact with liquid on said detecting surface whereby the presence of oil on said detecting surface can be ascertained by sensing a change of conductivity at said electrode means.

3. The apparatus as recited in claim 2, wherein there is a wiper to move across said detecting surface.

4. The apparatus as recited in claim 3, wherein there is a pair of resilient scrapers which are contacted and deflected by the wiper traveling a reciprocating path so as to remove sludge-like impurities from the wiper.

5. The apparatus as recited in claim 1, wherein the collector surface of the collector device is an endless surface which travels in a closed path into and out of said body of water.

6. The apparatus as recited in claim 5, wherein said collector device is a wheel with the collector surface being on the perimeter thereof, and said detecting surface is positioned at a location relative to said wheel above the location at which the wheel moves into said body of water.

7. The apparatus as recited in claim 5, wherein said apparatus is mounted on a float and said float is so arranged with respect to said apparatus that the endless surface of the collector device reaches into said body of water moderately below the top surface thereof.

8. The apparatus as recited in claim 1, wherein there is:
   a. a wheel member in said collector device which has the collector surface on its perimeter, and said wheel is arranged to rotate about its approximate center on an axis of rotation which has a substantial horizontal component, the wheel having its lower end extending at least to the surface of the body of water,
   b. a collector blade positioned against the perimeter of the wheel to remove liquid collected on the perimeter surface of the wheel, and
   c. a wiper to move across said detecting surface so as to remove collected matter therefrom.

9. A method to detect oil pollution in a body of water, said method comprising:
   a. moving into said body of water a collector device having a collector surface which is both oleophilic and hyrophilic, but is preferentially oleophilic in that the surface will become coated preferentially with oil when coming into contact with both oil and water,
   b. moving the collector surface out of said body of water to a detecting location,
   c. removing collected liquid from said collector surface at said detecting location onto a detecting surface, and
   d. detecting the character of said liquid on the detecting surface.

10. The method as recited in claim 9, wherein said detecting is accomplished by applying a voltage across the liquid on the detecting surface to determine conductivity of the liquid.

11. The method as recited in claim 8, wherein said collector surface is moved in a continuous closed path into and out of said body of water, and liquid is continuously collected from said surface and diverted onto said detecting surface.

* * * * *